United States Patent [19]

Ohuchi et al.

[11] Patent Number: 4,838,329
[45] Date of Patent: Jun. 13, 1989

[54] NONSKID DEVICE

[75] Inventors: Kiyoyuki Ohuchi; Ken'ichi Shimizu, both of Ibaraki, Japan

[73] Assignees: Agency of Industrial Science and Technology; Ministry of International Trade and Industry, both of Tokyo, Japan

[21] Appl. No.: 74,032

[22] Filed: Jul. 16, 1987

[30] Foreign Application Priority Data

Jul. 17, 1986 [JP] Japan ............................... 61-168663

[51] Int. Cl.$^4$ .............................................. B60C 11/16
[52] U.S. Cl. .................................... 152/210; 152/167; 152/211
[58] Field of Search ..................... 152/210–211, 152/208; 188/4 R, 4 B, 382; 301/45, 51; 238/14; 180/904; 16/18 R; 248/359.1; 36/59 R, 134, 115, 116; 30/350; 280/11.1 BR; 411/512, 431, 377, 372, 907, 508; 403/115, 134, 124, 122

[56] References Cited

U.S. PATENT DOCUMENTS

| | | | |
|---|---|---|---|
| 2,540,045 | 1/1951 | Crooker | 152/211 X |
| 2,572,996 | 10/1951 | Dunlap | 152/210 |
| 2,696,864 | 12/1954 | Crooker | 152/210 X |
| 2,869,311 | 1/1959 | Beeston, Jr. | 30/350 |
| 3,179,147 | 4/1965 | Edsmar | 152/210 |
| 3,842,880 | 10/1974 | Keinanen | 152/210 |
| 3,987,831 | 10/1976 | Walrave et al. | 152/210 |
| 4,619,301 | 10/1986 | Hiroki | 152/210 |

Primary Examiner—David Simmons
Attorney, Agent, or Firm—Oblon, Fisher, Spivak, McClelland & Maier

[57] ABSTRACT

A nonskid device for a tire, shoe sole or the like. The device comprises a stud that is embedded in a hole formed inwardly from the tread of the tire or shoe sole. The stud is a generally spherical or cylindrical body having an annular stud tip formed integrally therewith at one end thereof and is retained in the hole, either directly or via a cup, by an annular projection protruding inward from the wall of the hole. In normal slip-free travel, the stud tip does not project above the tread, and only the apex of the spherical or cylindrical body thereof is exposed at the plane of the tread. When the tread slips relative to the road surface, a force acts on the apex to cause the stud to rotate by a small angle. This causes the stud tip to rise beyond the plane of the tread and bite into the road surface. The stud tip thus comes into contact with the road surface only when required to prevent slipping, which, in the case of the device being applied to a vehicle tire, minimizes damage to the road and prevents pollution from road dust during normal driving.

6 Claims, 6 Drawing Sheets

NONSKID DEVICE

BACKGROUND OF THE INVENTION

1. Field of the Invention

This invention relates to a nonskid device, more particularly to a nonskid device incorporated in, for example, a vehicle tire for preventing the vehicle from slipping when traveling over an icy or snowy surface.

2. Prior Art Statement

In Japan, snow tires having treads provided with numerous studs are commonly used to prevent vehicles from slipping on icy surfaces. The tread of such a snow tire has embedded therein numerous studs which project from the tire surface by 1.5 to 2.0 mm. The studs are ordinarily provided with hard metal tips to protect them from wearing down. When a vehicle fitted with such studded snow tires travles over a road surface that is not covered with ice or snow, the road surface is gouged by the hard metal tips of the studs, and the gouged out material enters the surrounding air in the form of dust. This produces a pollution problem. One countermeasure that has been tried for holding down the amount of dust kicked up by vehicles using studded tires is that of limiting the projecting length of the studs to 1.0 to 1.5 mm and reducing the number thereof from the conventional 154 per tire to 122 per tire. While this is of course helpful, it is by no means a fundamental solution to the problem. What is more, it reduces the performance of the tire on icy surfaces and thus gives rise to a safety problem.

With a similar aim, there have also recently been proposed devices which project and retract studs depending on the road surface condition. The studs of these devices are, however, extremely complex in structure, and since they require a source of power (for example, a pneumatic or electrical actuator) for projecting and retracting the studs, they tend to be large in size and high in cost. This has prevented their practical application.

Therefore, there is a need for a nonskid device which does not gouge the road surface, is capable of maintaining the performance of the tire on snow and ice covered surfaces and thus ensuring safe travel over such surfaces, does not produce air polluting dust when traveling over a road surface not covered with ice or snow, and is small in size, low in cost, and reliable in operation.

OBJECTS OF THE INVENTION

An object of the invention is to provide a nonskid device for tires having a stud which normally remains at or below the tire tread but which immediately projects from the tread when the tread slips with respect to the road surface, thus promptly preventing further slipping.

Another object of the invention is to provide a nonskid device for tires having a stud which, without need for a source of driving power, is capable of projecting above the tread when slipping occurs and of retreating below the tread when the portion of the tread concerned leaves the road surface.

SUMMARY OF THE INVENTION

For attaining these objects, the present invention provides a nonskid device comprising a stud ball having a stud tip, the stud ball being housed in a hole in a tire having an opening at the tire tread such that the top of the ball falls substantially in the plane of the tread and being biased so as to be positioned at the center of the hole.

With this construction, when no slipping arises between the tread and the road surface, only the apex of the ball comes into contact with the road surface. However, when the tread slips with respect to the road surface, the ball overcomes the biasing force and rotates, causing the stud tip to project above the tread and make contact with the road surface, which works to prevent further slipping. When the stud tip departs from the road surface with rotation of the tire, it is returned to its initial position by the restoring force of the tire material.

Thus, as the stud tip projects only when slipping arises between the tread and the road surface and as the biasing force is supplied by the tire material, the device is very economical to fabricate and is highly suited to use in a studded tire.

The above and other objects and features of the invention will become more apparent from the following detailed description with reference to the accompanying drawings.

DETAILED DESCRIPTION OF THE PREFERRED EMBODIMENTS

Figure 1:
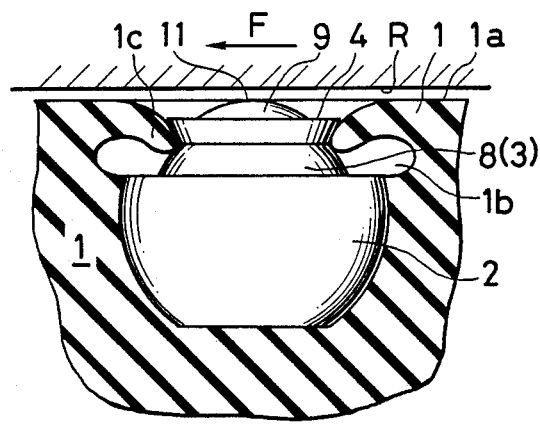
FIG. 1 is a sectional view of a portion of a tire in which a nonskid device according to a first embodiment of the invention is embedded.
Figure 2:
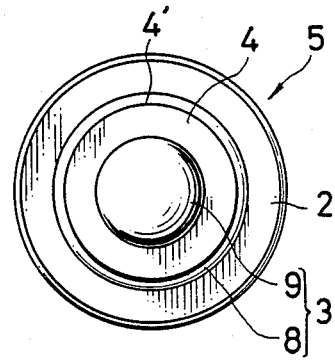
FIG. 2 is a top view of the nonskid device of FIG. 1.
Figure 3:
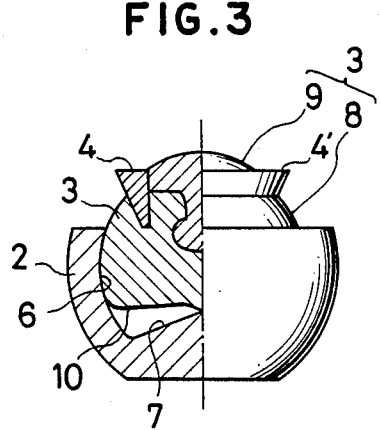
FIG. 3 is a front view of the same with a portion of the stud shown in section

A first embodiment of the nonskid device according to the invention is illustrated in FIGS. 1 to 3, wherein 1 denotes a body in which the nonskid device is used (e.g., a tire), 1a the tread of the tire, and 1b a hole formed in the tire immediately under the thread 1a such as to have an opening to the exterior at the plane of the tread 1a. A stud 5 constituted of a cup 2, a ball 3, and a stud tip 4 is embedded in the tire 1 by being accommodated in the hole 1b. The ball 3 is held in positioned by an edge portion 1c which projects into the hole 1b and abuts against the side surface of the stud tip 4 so as to hold the ball 3 in such position that its apex 11 falls both at the center of the hole and in the plane of the tread 1a. The material of the tire 1 is somewhat resilient and has a large force of restoration.

The cup 2 is formed of steel, for example, and is open at one end (the upper end in the drawing). The cup 2 has a spherical inner surface 6 and an inner bottom surface 7 that is highest in the center and slopes downward toward the periphery. The geometric center of the spherical inner surface 6 falls within the inner space defined by the cup 2. The ball 3 is constituted of a ball body 8 and a cap 9 fitted firmly on the top of the ball body 8. While the ball body 8 and the cap 9 together give the ball 3 a generally spherical shape, the outer bottom surface 10 of the ball 3 projects downward at the center and is formed as an inclined surface slanting toward the periphery. The ball body 8 is formed of a material with excellent sliding property such as a self-lubricating sintered alloy, while the cap 9 is formed of, for example, a rubber material exhibiting a high coefficient of abrasion. The stud tip 4 is formed of a hard metal or other material that is highly resistant to abrasion. The stud tip 4 is annular in shape and is firmly embedded in the ball body 8 such that its edge 4' is situated lower than the apex 11 of the ball and within the circle defined by the upper inner edge of the cup 2.

Because of the aforesaid structure of the nonskid device according this embodiment, when the tread 1a of the tire 1 comes in contact with the road surface denoted by R, the apex 11 of the ball 3 will make only slight contact with the road surface R since it is in the plane of the tread 1a.

Figure 4:
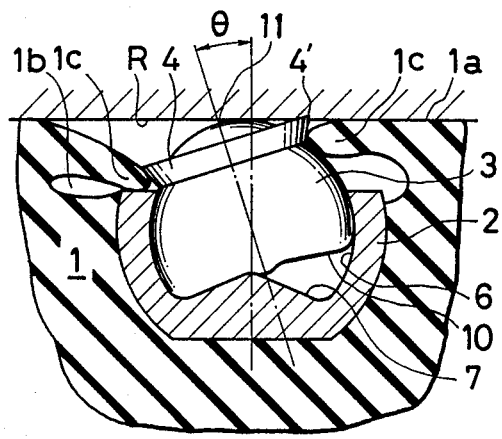
FIG. 4 is an explanatory view showing the device of FIG. 1 in operation.

If the road surface R is covered with ice or snow and the tread 1a should slip with respect thereto, a force F will act on the apex 11 in the direction of slip as indicated by the arrow (FIG. 1). As a result, a rotation moment will act on the ball 3, causing the ball to rotate within the cup 2 by an angle $\theta$, as shown in FIG. 4. At the same time, the edge 4' of the stud tip 4 will move to the position previously occupied by the apex 11, where it can contact and dig into the road surface R. At this time the inclined portion of the outer bottom surface 10 of the ball body 8 abuts against the inclined inner bottom surface 7 of the cup 2, preventing further rotation of the ball 3. As a result, further slipping between the tire tread 1a and the road surface R is prevented.

Next, when this portion of the tread 1a separates from the road surface R because of further rotation of the tire, the ball 3 will be immediately restored to the position at which the apex 11 is at the center of the hole 1b by the force of restoration applied thereto by the edge portion 1c supporting the stud through abutment with the stud tip 4.

On the other hand, when the road surface is dry, since no slipping will arise between the tread 1a and the road surface R, no force F will act on the apex 11 of the ball 3 so that the ball 3 will not rotate and the stud tip will not come in contact with the road surface.

Thus the nonskid device according to the present invention causes the edge 4' of its stud tip 4 to project from the tread 1a and dig into the road surface R immediately at the time, and only at the time, that slipping occurs between the tread 1a of the tire 1 and the road surface. When no slipping occurs, (that is, during normal travel), the apex 11 of the ball 3 merely comes in light contact with the road surface so that the traction required for traveling of the vehicle is provided solely by the contact between the tread 1a and the road surface R. Therefore, since the apex 11 of the ball is made of rubber or the like and lies substantially in the plane of the tread 1a, it does not gouge or abrade the road surface.

Figure 5:
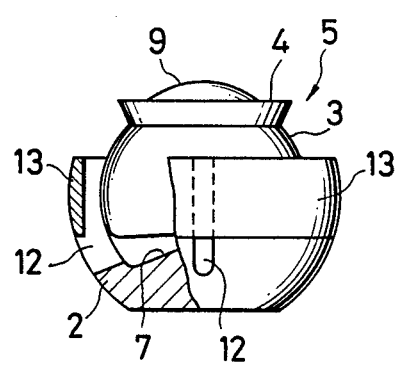
FIG. 5 is a front view, partially in section, of a nonskid device like that of FIG. 1, but with a modified stud.
Figure 6:
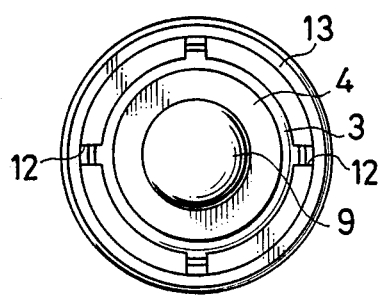
FIG. 6 is a top view of the nonskid device of FIG. 5.

FIGS. 5 and 6 show a modification of the embodiment of the nonskid device shown in FIG. 1. As this nonskid device differs from that of FIG. 1 only in the structure of the stud 5, only the stud is shown in FIGS. 5 and 6. Referring to the drawings, the cup 2 is provided with a plurality of vertical slits 12 extending from near its inner bottom surface 7 to its upper edge, thus dividing the upper portion of the cup 2 into a plurality of segments which are joined together in the vicinity of the inner bottom surface 7. The provision of the slits 12 makes the upper portion of the cup 2 inwardly flexible. Around the upper portion of the cup 2 is snugly fitted a squeeze ring 13 made of Ni-Ti or some other shape memory alloy whose transformation temperature coincides with the lowest temperature at which it can be presumed that the road will not be covered with ice or snow. Such a temperature would, for example, be about 10° C. Thus at temperatures not lower than 10° C., the diameter of the squeeze ring 13 is reduced so that the segmented upper portion of the cup 2 is flexed inwardly, while at temperatures below 10° C., the inner diameter of the squeeze ring 13 becomes larger than the outer diameter of the upper portion of the cup 2 so that no squeezing force is exerted on the cup 2.

The stud 5 having the squeeze ring 13 around its cup 2 is embedded in a tire (not shown) in the same manner as illustrated in FIG. 1. When the tire provided with the stud 5 travels over a road surface whose temperature is at or above 10° C., since the squeeze ring 13 is in a reduced diameter state at this temperature, the upper portion of the cup 2 will be squeezed inwardly by the squeeze ring 13 with such force as to firmly grip the ball 3 therein and prevent it from rotating. At this temperature, therefore, only the apex 11 of the ball 3 will be exposed at the plane of the tread, while the edge 4' of the stud tip 4 will be retained in non-projecting state, meaning that there will be no danger of the road surface being damaged by the stud tip 4 when the action of the stud tip is unnecessary. On the other hand, when the tire travels over a road surface which is covered with ice or snow and is thus at a temperature below 10° C., the squeeze ring 13 will restore to its original increased diameter, thus releasing the ball 3 from the squeezing force. As a result, the ball 3 will be free to rotate within the cup 2 so that immediately that slipping occurs, the edge 4' of the stud tip 4 will project from the tread 1a and bite into the road surface, thus preventing further slipping.

Figure 7:
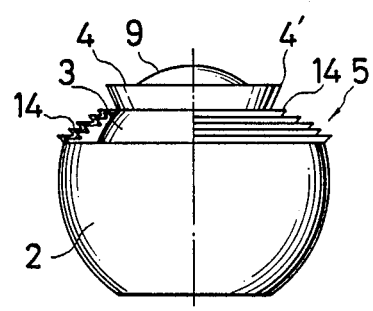
FIG. 7 is a front view, partially in section, of a nonskid device like that of FIG. 1, but with another modified stud.

FIG. 7 shows a stud according to another variation of the nonskid device illustrated in FIG. 1. This stud 5 differs from that in FIG. 1 only in being provided with a flexible film member 14 covering the region between the top of the cup 2 and the bottom of the stud tip 4. The prupose of this film member 14 is to prevent sand and the like from getting into the gap between the cup 2 and the ball 3 and hindering the proper movement of the ball 3. While the ball 3 is gripped by the edge portion 1c, it is easy for sand or the like to enter the cup 2 through the gap between the edge portion 1c and the ball 3. However, by providing the film member 14 so as to cover the exposed region of the cup 2, it is possible to completely prevent the invasion of sand and to ensure that the ball will operate properly when the tread slips on the road surface.

Figure 8:
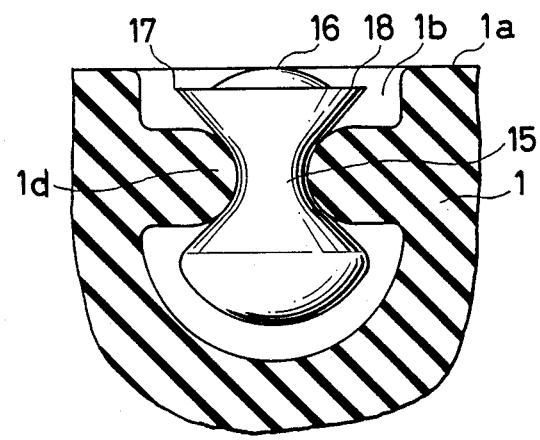
FIG. 8 is a sectional view of a portion of a tire in which a nonskid device according to a second embodiment of the invention is embedded.
Figure 9:
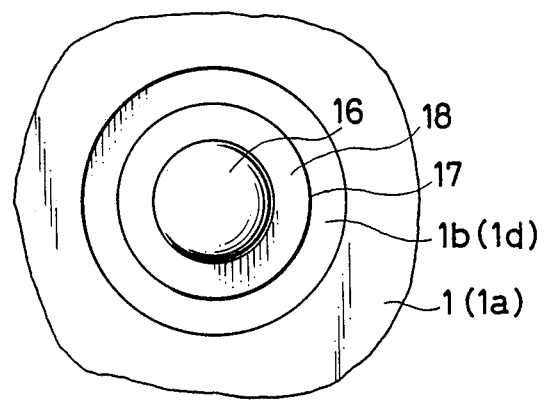
FIG. 9 is a top view of the nonskid device of FIG. 8.

FIGS. 8 and 9 show a second embodiment of the nonskid device according to the invention in which the ball and stud portions of a stud embedded in a hole immediately below the tread of a tire are integrally formed as a single body.

As in the preceding embodiment, the tire 1 is constituted of a resilient material such as rubber and has a hole 1b with an opening at the tread 1a.

An annular projection 1d provided midway of the height of the hole 1b projects inwardly to support a stud 5'. The cross-sectional shape of the tip of the annular projection 1d is semicircular.

Figure 10:
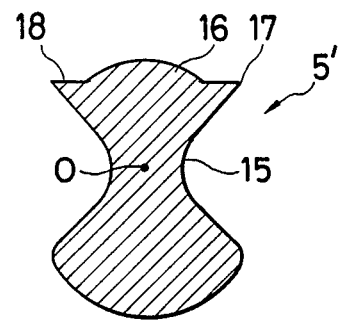
FIG. 10 is a sectional view of the stud of the nonskid device of FIG. 9.

As shown in FIG. 10, the stud 5', which is formed of a hard metal, is of the shape of a cylinder having a narrowed waist 15 at the middle of its axial length. The stud 5' is supported at the waist 15 by the annular projection 1d in the hole 1b. Therefore, the waist 15 is made to have a diameter substantially equal to the inner diameter of the annular projection 1d and the curvature in the vicinity of the waist 15 is made complementary to that of the tip of the annular projection 1d. The bottom surface of the stud 5' is given a rounded shape to facilitate its insertion into the hole 1b. The top surface thereof has a dome-shaped protuberance 16, and the periphery thereof is formed as a sharp edge 17 capable of operating as a stud tip. The stud 5' is formed so that the distance between the center 0 of the waist 15 and the apex of the protuberance 16 is greater than the distance between the center 0 and the sharp edge 17.

The stud 5' of the aforesaid structure is held in the hole 1b of the tire 1 with its central axis coincident with the central axis of the hole 1b, and with its waist 15 having the annular projection 1d fitted therein so as to position the apex of the protuberance 16 substantially in the plane of the tread 1a.

The operation of the nonskid device of the foregoing structure will now be explained.

Figure 11:
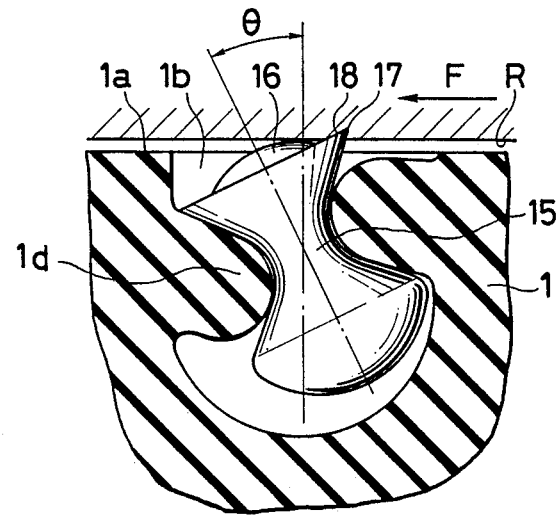
FIG. 11 is an explanatory view showing the device of FIG. 1 in operation.

The stud 5' is resiliently supported such that the apex of the protuberance 16 just makes contact with the road surface R when the tread 1a of the tire 1 comes in contact with the road surface. When the road surface R is covered with ice or snow and the tire 1 slips with respect thereto, a force F will act on the apex of the protuberance 16 in the direction of slip (FIG. 11). As the stud 5' is firmly supported at the waist 15 by the resilient material of the annular projection 1d, a rotation moment will act on the stud 5' and the annular projection 1d will be deformed, allowing the stud 5' to tilt with respect to the vertical axis of the hole 1b. At the same time, the sharp edge 17 will be rotatingly displaced so as to project beyond the tread 1a and bite into the road surface R. At this time, the road surface R will exert a bracking force acting in the direction of slip prevention on the side of the stud 5' adjacent the sharp edge 17, thus preventing further slip between the tire and the road surface.

When the portion of the tire tread 1a concerned leaves the road surface, the stud 5 is restored to its original orientation by the restoring force from the annular projection 1c.

Figure 12:
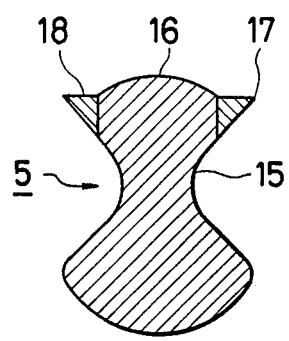
FIGS. 12 and 13 are sectional views of modified studs.

While the entire stud 5 of the aforesaid embodiment is integrally formed of hard metal, it is alternatively possible, as shown in FIG. 12, to form only the edge portion 18 of hard metal, thus reducing the amount of this material that need be used.

Figure 13:
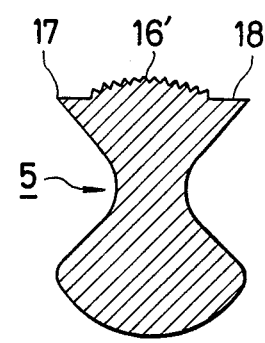
Figure 14:
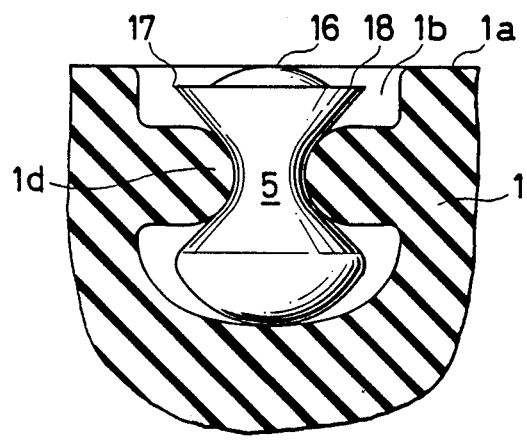
FIG. 14 is a sectional view of a nonskid device like that of FIG. 8, but with a modified stud.

Further, as shown in FIG. 13, instead of being made smooth on top, the protuberance 16 can be provided with a jagged surface 16' constituted of concentric ridges and valleys. This arrangement ensures more positive slip preventing effect with respect to ice or snow covered road surfaces FIG. 14 shows a variation of the embodiment of FIG. 8 in which the bottom of the stud 5' is in contact with one portion of the bottom of the hole 1b. In this case, since a portion of the bottom surface of the stud 5' will abut on the floor of the hole 1b when the sharp edge 17 projects outward beyond the tread 1a, it becomes possible to obtain a large slip preventing force while leaving a non-contact region of an extent sufficient to assure that restoration of the stud 5 to its initial orientation will not be hindered.

Figure 15:
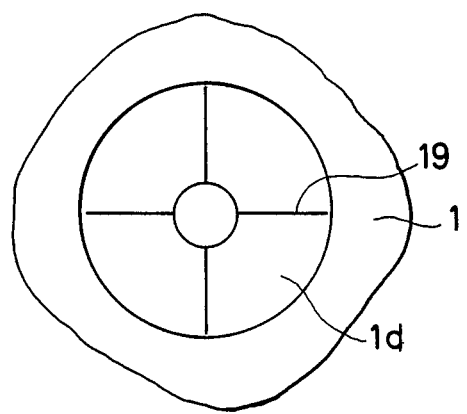
FIG. 15 is a sectional view of a nonskid device like that of FIG. 8, but with another modified stud.

Further, as shown in FIG. 15, the annular projection 1d of the hole 1b can be provided with a plurality of slits 19 to obtain an enhanced cushioning effect that contributes to a further reduction in damage to the road surface.

Specific examples of the nonskid device according to the invention will now be described.

A self-lubricating sintered alloy ball measuring 10 mm in diameter was fitted into a steel cup so as to be rotatable therein, thus forming a stud of the structure illustrated in FIG. 3. A hole was formed inward from the tread of a segment of a used tire, and the stud of the aforesaid structure was inserted therein such that the apex of the ball fell substantially in the plane of the tread. An annular stud tip made of hard metal and measuring 3 mm in height and 10 mm in diameter was implanted in the ball with its center coincident with the ball apex.

Figure 16:
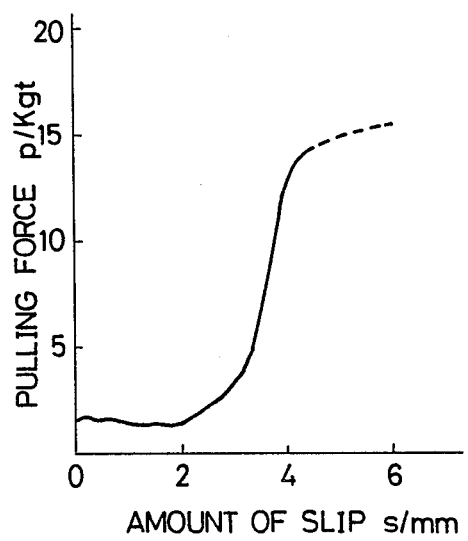
FIG. 16 is a graph showing the relationship between amount of slip and pulling force in the nonskid device according to the invention.

The nonskid device of the aforesaid structure was pulled across ice under a pressure of 15 kg, and the relationship between amount of slip and pulling force was investigated. The results obtained are shown in the graph of FIG. 16. As will be noted, after a slip of about 3 mm, the pulling force increased sharply, indicating that the stud produced an effective action with respect to the ice surface.

While two embodiments and a number of variations were described in the foregoing, all of these work on the same principle of the stud tip projecting from the tread of the tire when and only when slip occurs between the tread and the road surface. As a result, slipping of the tire can be minimized, and damage to the road surface can be greatly reduced using a device that is of extremely simple structure and low cost. Although the nonskid device has been described herein as being applied to a tire, it is by no means limited to this application and may also be applied to the sole of a boot or shoe to ensure greater safety to the wearer when walking on ice or snow.

What is claimed is:

1. A nonskid device comprising a stud embedded in a hole formed radially inwardly from a tread surface of a body made of a resilient material, said stud comprising a cup open at its radially outer surface and having an inner surface at least one portion of which constitutes a spherical guide surface, a ball retained in said cup so as to be rotatable along said spherical guide surface and so as to have one portion thereof exposed above the open radial outer surface of said cup, and an annular stud tip attached to and projecting from the exposed portion of said ball, said stud being supported in said hole by a support means formed by an edge of the body surrounding said hole, said support means exerting a biasing force on said stud tending to hold its apex at the same height as said tread surface and at the center of said hole, said ball and said annular stud tip being sized, shaped, and positioned so that, when a force parallel to said tread surface is applied to said stud, said stud rotates so that said annular stud tip projects from said tread surface, but when such force is removed, the resilience of said body causes said ball to rotate relative to said cup so that said annular stud tip no longer projects from said tread.

2. A nonskid device according to claim 1, wherein said one portion of said ball exposed above the open radial outer surface of said cup is formed of a rubber material exhibiting a high coefficient of abrasion.

3. A nonskid device according to claim 1, wherein:
(a) said cup comprises a plurality of segments which have lower ends joined together and which are defined by a plurality of slits extending from the open radial outer surface of said cup and
(b) a squeeze ring is snugly fitted around said plurality of segments.

4. A nonskid device according to claim 3, wherein:
(a) said squeeze ring is made of shape memory alloy capable of expanding under low temperatures and
(b) said squeeze ring is sized, shaped, and positioned so that, when said squeeze ring is in its expanded condition, said ball can rotate relative to said cup, but so that, when said squeeze ring is in its contracted condition, said ball cannot rotate relative to said cup.

5. A nonskid device according to claim 1, and further comprising a flexible film member covering a region between the open radial outer surface of said cup and the bottom of said annular stud tip.

6. A nonskid device according to claim 1, wherein said one portion of said ball exposed above the open radial outer surface of said cup is provided with a jagged surface constituted of concentric ridges and valleys.

* * * * *